UNITED STATES PATENT OFFICE.

GEORGE AUSTIN MARSH, OF LITTLETON, MASSACHUSETTS, ASSIGNOR TO THE AVERY LACTATE COMPANY, OF PORTSMOUTH, NEW HAMPSHIRE.

MANUFACTURE OF LACTATES AND LACTIC ACID.

SPECIFICATION forming part of Letters Patent No. 290,252, dated December 18, 1883.

Application filed September 26, 1883. (No specimens.)

*To all whom it may concern:*

Be it known that I, GEORGE A. MARSH, of Littleton, in the county of Middlesex, and in the State of Massachusetts, have invented certain new and useful Improvements in the Production of Lactates and Lactic Acid; and I do hereby declare that the following is a full, clear, and exact description thereof.

My invention relates to the manufacture of lactic acid and the lactates, and will be more fully set forth hereinafter.

In my application filed August 30, 1883, I described my process with special reference to the various starch-containing vegetable substances. My present invention has especial reference to such vegetable gums as have substantially the same constitution, such as dextrine, inuline, moss-starch, vegetable mucus, gum-arabic, or other vegetable gums having the formula $C_6H_{10}O_5$. I prefer to form my dextrine or gum from the meal or flour of Indian corn, or maize, as this substance furnishes the necessary amount of albuminoid matter. The reaction which takes place in the fermentation of dextrine is this: $C_6H_{10}O_5 + H_2O = 2C_3H_6O_3$—that is, one molecule of water is taken up by a molecule of gum and forms two molecules of lactic acid.

In carrying my present invention into practice, I put, say, two thousand pounds of meal into a vat, and to this add sufficient water (say about four times the weight of the meal, or eight thousand pounds of water) acidified with, say, eighty pounds of sulphuric acid, to make the entire mixture amount to about eight hundred gallons. I do not limit myself to these exact proportions of either water or acid; but I find in practice that about four times the weight of the meal is a good proportion of water, and to acidify the latter about four per centum of the weight of the meal (or eighty pounds to the quantity of meal stated in the illustration) is a good proportion of sulphuric acid, though I may use any quantity of the latter between the limits of one per centum and ten per centum of a given quantity of meal for the purpose of acidifying the water with which the meal is mixed. This mixture is then boiled for about two hours, or until the starch in the meal has all been transformed into dextrine except a small proportion, which has been converted into glucose; but this latter element has no effect, so far as the subsequent fermentation (to be hereinafter described) is concerned, as when I employ a dextrine solution wholly free from glucose the fermentation proceeds just the same. This gummy solution, resulting from the boiling of the mixture of meal and acidified water, is now neutralized with carbonate of lime, (about equal proportions of which, by weight, as there was used of sulphuric acid being necessary, although other carbonates or alkalies may be used for neutralizing in chemically-equivalent proportions,) and this mixture is next cooled to between 104° and 113° Fahrenheit, or substantially to this temperature, which may be somewhat varied from these preferred limits. My next step is the fermentation of this cooled mixture and the production thereby of lactic acid therefrom. I first add about fifty gallons of an active lactic ferment to the described mixture, and immediately thereafter put in about one thousand pounds of carbonate of lime, to neutralize the lactic acid as fast as formed, maintaining substantially the same temperature (about 104° to 113° Fahrenheit) until the fermentation is entirely completed, which will ordinarily require from two to four days. The resulting product is a crude mass of the neutral lactate of lime.

When I employ pure dextrine, (or any of the other gums named,) or without first producing the dextrine from the meal of maize, as hereinbefore set forth, it is necessary to add to the said dextrine or other gum about ten per centum of vegetable albuminoid matter (as well as about four times the weight of this mixture of water) in order to secure the necessary fermentation when the lactic ferment is added thereto; otherwise the process is as hereinbefore set forth, (so far as relates to fermentation and neutralization,) the proportions of carbonate of lime and lactic ferment being the same with reference to the gum and albuminoid matter combined as they are with respect to the meal when I make the dextrine, instead of taking that already in the market, it being understood that the water added in this latter case is free from sulphuric acid, of course.

By my hereinbefore set forth process I obtain from the various vegetable gums named crude crystals of the lactates substantially free from the butyric and other foreign ferments, the presence of which has heretofore presented an almost insuperable obstacle to the formation of said crude crystals in the processes commonly set forth in treatises on the subject. When I employ carbonate of lime, of course I will produce calcium lactate; but I do not confine myself to this substance as a neutralizer, as various other bodies which are well known to chemists may be used instead with good results, those of a strongly alkaline nature having to be added gradually, however, instead of all at once, which is a point in favor of the use of carbonate of lime.

Heretofore in the production of lactic acid from glucose, &c., it has been customary to stir the mixture of vegetable sugar, lactic ferment, &c., from time to time during the process of fermentation; but I have discovered that in order to successfully produce the acid from dextrine and analogous gums it is necessary to wholly prevent agitation of the mass during fermentation, and thereby avoid butyric and other destructive fermentations which were caused by agitation to such extent as to decompose the lactate already formed and prevent further formation of lactic acid when the mixture was subjected to stirring.

Having thus described my invention, what I claim as new, and desire to secure by Letters Patent, is—

1. The method of manufacturing lactic acid and the lactates by the fermentation of dextrine or other gums of vegetable origin isomeric therewith, in the presence of water, and of an active lactic ferment sufficiently charged with a substance to neutralize the acid, and preventing agitation during the fermentation, substantially as set forth.

2. The method of forming lactic acid and the lactates by the fermentation of dextrine or other gums of vegetable origin isomeric therewith, consisting in adding an active lactic ferment thereto, together with a substance to neutralize the lactic acid as fast as formed in the presence of water at a temperature of about 104° to 113° Fahrenheit, maintained continuously, and preventing agitation during such fermentation until a crude neutral mass of lactate is thereby produced, substantially as set forth.

In testimony that I claim the foregoing I have hereunto set my hand, at Boston, in the county of Suffolk and State of Massachusetts, in the presence of two witnesses.

GEORGE AUSTIN MARSH.

Witnesses:
WILLIAM L. THOMPSON,
CHARLES N. WAITE.